April 23, 1968      P. LEMS      3,378,987
EDGE PROTECTOR APPLICATOR
Filed April 29, 1965      6 Sheets-Sheet 6

INVENTOR
Peter Lems
BY Dressler, Goldsmith, Clement, Gordon & Todd
ATTORNEYS

United States Patent Office 3,378,987
Patented Apr. 23, 1968

3,378,987
EDGE PROTECTOR APPLICATOR
Peter Lems, Wilmette, Ill., assignor to Signode
Corporation, a corporation of Delaware
Filed Apr. 29, 1965, Ser. No. 451,819
18 Claims. (Cl. 53—124)

ABSTRACT OF THE DISCLOSURE

An arrangement is disclosed for a strapping station for applying angled-leg type edge protectors to a corner region of a bundle, the arrangement including guide tracks located to extend generally normal to the exposed bundle corner regions and a separate applicator mounted on each track and movable along a straight line approach path to effect deposit of the edge protector on the corresponding bundle corner region. Each applicator incorporates a magazine storing a stack of nested edge protectors oriented in an oblique relation and each with its concave face foremost, the applicator having its feed end facing directly toward the bundle and provided with a side discharge opening and with an external gripper mechanism that defines a chute aligned with the discharge opening to releasably hold an ejected edge protector in an oblique orientation wherein its free end is forward of its gripped end. An ejector is reciprocably mounted at the feed end of the applicator to eject the lead protector of the stack endwise through the discharge opening.

Straight line approach movement of the applicator brings the free end leg corner into initial contact with the bundle adjacent the corner and sets up a reaction causing a twisting and realigning of the edge protector as it automatically strips from the gripper mechanism and seats flush against the bundle corner.

The external gripper mechanism includes a back up plate to react against the external apex line region of the ejected edge protector, a pair of spring-loaded swingably mounted jaws engageable with opposite lateral extremities of the ejected edge protector, an actuator for releasing one jaw before the other, and a pair of levers to control the orientation of the ejected edge protector after release by the jaws.

This invention relates to an applicator for incorporation in a strapping system to apply edge protectors at exposed corner regions of a bundle prior to tightening of a strap loop upon such corner regions. More particularly, the invention is concerned with an edge protector applicator operable when advancing along a straight line movement path to effect proper feeding and seating of an edge protector upon an exposed corner region. Its adaptability to straight line motion mounting systems renders the applicator useful directly with many existing types of bundle strapping arrangements, while also simplifying the applicator mounting and control equipment.

There are many types of bundles now being tied by strapping that are prone to edge damage caused by the strap loop by which it is tied. High tension is drawn on the strap loop by the strapping machine during formation and completion of the strap loop. This high tension is sometimes greatly exaggerated by the "working" of the bundle during subsequent handling and shipping and it causes the strap to crush the bundle material at the exposed corners producing permanent and objectionable impressions at these corner regions of the bundle.

Typical materials where this problem is currently encountered include lumber, plywood, boards and similar forest products. Numerous other materials which may not currently be tied by means of strapping could also be handled if the edge damage problem and its effect on the cost of the packaging operation could be reduced or eliminated.

Edge protectors have been applied manually to bundles subject to edge damage by the strap loop and some mechanical arrangements have been devised for automating the application of edge protectors to the bundles. There is a current need for a truly effective edge protector applicator which can be fully automated, which can be actuated by a simple mechanical mounting arrangement to facilitate easy integration with conventional strapping machines and existing installations and which is inexpensive and durable.

When edge protectors are to be fed mechanically to exposed corner regions of a bundle it is convenient in effecting actual seating of the edge protector to orient it initially in a twisted relation with respect to its final position and to rotate and skew it as it contacts and seats on the corner region. This technique obviates many mounting clearance problems that usually exist at strapping stations for bundles where edge protectors are required. This technique also enables easy adaption of the equipment for accommodating bundles of different sizes and shapes at the same strapping station. It is desirable to have an edge protector applicator operable along a straight line travel path and effective to produce the desired twisting and skewing reorientation of the edge protector as it contacts and seats on the corner region where it is to prevent edge damage.

An edge protector applicator having the desirable features indicated above is provided in accordance with the teachings of the present invention. The applicator of this invention conveniently may be mounted from a horizontal track of a strapping station to move in a straight line between a retracted position remote from the corner region of the bundle and a feed position adjacent to the bundle. The applicator is provided with an external chute to hold an edge protector in a forwardly angled orientation as the applicator advances the edge protector towards contact with the corner region of the bundle. The applicator is provided with means developing a force moment on the edge protector as it contacts the bundle to effect stripping of the edge protector from the chute and desired reorientation of the edge protector to bring it to fully seated relation.

In the preferred practice of the invention the applicator is elongated to incorporate a supply magazine holding a stack of nested edge protectors for sequential feeding towards the forward end of the applicator and one by one ejection into the chute.

More particularly, the invention provides edge protector applicators to be incorporated in a strapping system wherein bundles of generally rectangular shape are located on a support at the strapping station to receive strap loops. The station may have upper horizontal tracks and lower horizontal tracks associated with the support and mounting a set of four applicators, one for each corner region of the bundle. Where the strapping equipment is arranged to complete and seal the loop along the top side of the bundle, the edge protectors are arranged to present a larger contact wall on the top and bottom bundle surfaces as the greatest stress due to the strap loop occurs at these locations. An important feature of the present applicator is that the same basic embodiment serves for each of the corner locations. Preferably horizontal travel of the applicator is employed to effect feeding and seating of the edge protectors as greatest clearance is available in this direction. Another feature of the applicator is that it is capable of use in any orientation where the requirements of the installation make this necessary.

Other features and advantages of the invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of the specification, and in which like numerals are employed to designate like parts throughout the same.

Figure 1:
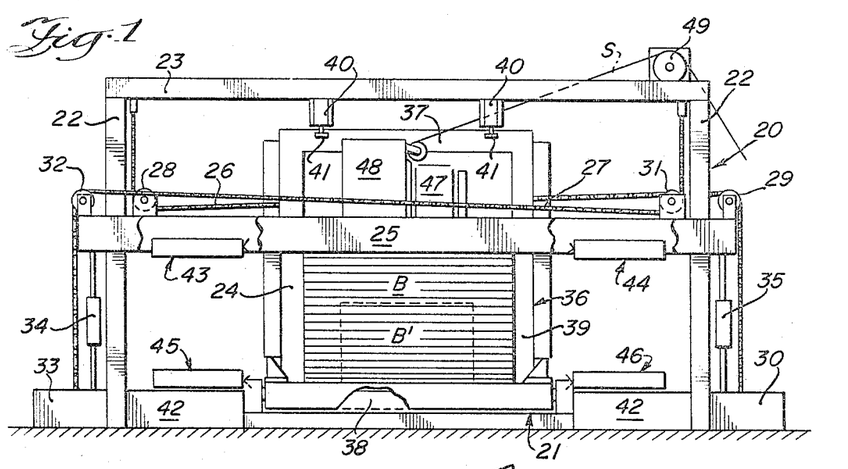
FIGURE 1 is a front elevational view of a strapping station for tying bundles such as lumber, the station being equipped with applicators arranged in accordance with the preferred practice of this invention for feeding edge protectors to corner regions of the bundle prior to tightening a strap loop about the bundle.

Referring now to the drawings and particularly to FIG. 1, the invention is disclosed herein in relation to a strapping system for tying strap about a bundle B of lumber. The system includes a strapping station designated generally at 20 bridging a conveyor 21 that provides an anti-friction support along which the bundles may be conveniently transported prior to and after being tied with strap S. The strapping station 20 is typical of current practice and it includes a pair of vertical posts 22, a stationary crossbar 23 carried by the posts 22, and a stationary vertical locator post 24 mounted along one side of the conveyor 21.

The conveyor 21 is illustrated as being of a roller type and it serves as a support at the strapping station for locating the bundle B in proper relationship thereat. A vertical compression bar 25 is shown spanning the conveyor, it being suspended by means of a pair of chains 26 and 27. Chain 26 leads downwardly from the left end of the stationary crossbar 23, then around a pulley 28, then horizontally to the opposite end of the vertical compression bar and around a pulley 29 to be anchored to a stationary block 30. In a similar fashion, the chain 27 leads around the pulleys 31 and 32 and is anchored to a stationary block 33. These chains are conventional and function to stabilize the compression bar 25 in a true horizontal relationship. Positioning cylinders 34 and 35 are represented diagrammatically between the base blocks 30 and 33 and the extreme end of the vertical compression bar 25. These cylinders operate in unison to raise or lower the compression bar 25 while the chains 26 and 27 maintain it horizontal.

As is also conventional, the strapping station is shown equipped with a horizontal compression farme 36 which is shiftable horizontally to compact the bundle against the stationary vertical locator post 24. The horizontal compression frame 36 is U-shaped and has upper and lower horizontal bars 37 and 38, respectively, connected by a vertical post 39. A set of hangars 40 are suspended from the stationary top cross-bar 23 and equipped with guide rollers 41 for guiding horizontal movement of the compression frame.

In the usual operation, the vertical compression bar 25 and the horizontal compression frame 36 function conjointly in compressing each bundle B towards the support presented by the conveyor 21 and towards the stationary vertical locator post 24 so that the bundle is properly compressed before application of a stray loop for tying the bundle. Thus, the station may handle bundles of different size and for purposes of disclosure, in FIG. 1, a bundle B' is illustrated in dotted lines and it will be apparent that the vertical compression bar 25 must move substantially lower and the horizontal compression frame 36 must move substantially further to the left for compacting the bundle B' prior to application of a strap loop. The vertical compression bar 25 is provided with horizontal track structure and the station includes base structure 42 which also is provided with horizontal track structure.

In accordance with this invention, a mechanical arrangement is provided for applying edge protectors to exposed corner region of the bundle. In the present instance, the bundle B is generally rectangular in transverse cross section and is to receive a separate edge protector E at each of its four exposed corner regions. Applicators for this purpose are designated 43, 44, 45 and 46 and of these the upper pair 43 and 44 are associated with the track structure provided by the compression bar 25 and the lower pair 45 and 46 are associated with the track structure provided by the base 42. The conveyor 21 determines the level of the exposed lower corners of the bundle and the lower pair of applicators 45 and 46 are located at the proper elevation for applying edge protectors to these exposed lower corner regions of the bundle. The elevation of the exposed upper corner region of the bundle is determined by the height of the bundle which is located on the conveyor 21 and the vertical compression bar 25 automatically finds this level when it compacts the bundle. Therefore, the provision of track structure within this compression bar convenienty locates the upper pair of applicators 43 and 44 at the proper elevation for applying protectors to the upper corners of the bundle.

In the strapping station arrangement illustrated herein the actual strapping equipment is also mounted on the vertical compression bar 25 and it may include an electric motor driven strapping head 47, such as the Signode type M–22, and a conventional stretch-out box 48 stationed next to the strapping head and fed from a coil of strap (not shown) which is positioned alongside the strapping station and threaded over a feed pulley 49 mounted on the stationary upper crossbar 23 that spans the station.

The general operation at the strapping station is to compact the bundle and while the horizontal compression frame 36 and the vertical compression bar 25 are in compacting engagement with the bundle B, the applicators 43, 44, 45 and 46 are caused to advance towards the bundle corners and apply and hold an edge protector on each corner. At this time, a loop of strap S is formed about the bundle, tensioned and then sealed, with the strap overlying the edge protectors E to prevent the strap from damaging the exposed corner regions of the bundle. While it is preferred in the use of present day equipment that the edge protectors be in place at the time the strap is threaded around the bundle, it will be apparent that the invention need not be limited to this arrangement.

Figure 4:
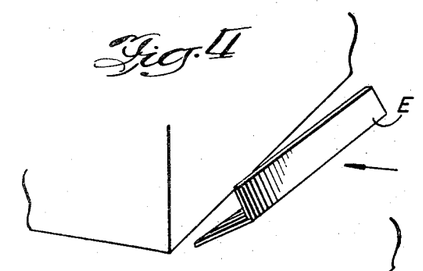
FIGURES 4, 4A, 4B and 4C are corresponding diagrammatic rear perspective views illustrating the changing orientation of an edge protector as it approaches, contacts and finally seats upon a lower corner region of a bundle.
Figure 4A:
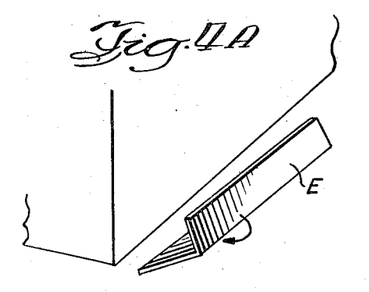
Figure 4B:
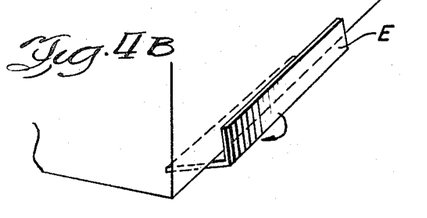
Figure 4C:
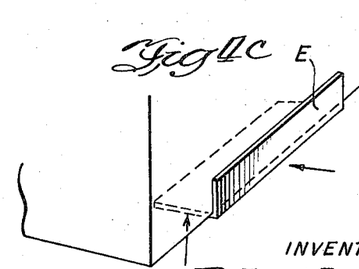

The edge protectors E are best seen in the sequence views of FIGURES 4 to 4C and may be of any material suited to the needs of engaging a corner region of a bundle in a snug relationship and protecting that corner region from damage due to a highly tensioned strap wrapped tautly around it. In the usual practice the edge protector is a steel angle and preferable has one long leg and one short leg, with the long leg to be positioned on either the top or bottom face of the bundle for the particular arrangement disclosed herein. Since the strapping equipment is at the top of the bundle and the loop is tensioned and sealed across the top face of the bundle greater strap pressure acts against the top and bottom faces of the bundle. The provision of the longer leg of the edge protector angle on the bottom and top faces is desirable for achieving optimum protection against strap pressure damage. The greater area of the long leg distributes the higher force acting against the top and bottom faces of the bundle to prevent excess pressure concentrations.

It should be noted that the applicators are essentially similar but slight variations exist in the external chute relationships to accommodate the different orientation relationships arising at the bundle corner regions. In particular, applicators 43 and 46 are identical and applicators 44 and 45 are identical.

The remainder of the drawing figures are specifically concerned with the edge protector applicator 45 which is shown at the lower left corner of FIG. 1 but the principles are applicable to each of the other applicators.

Figure 2:
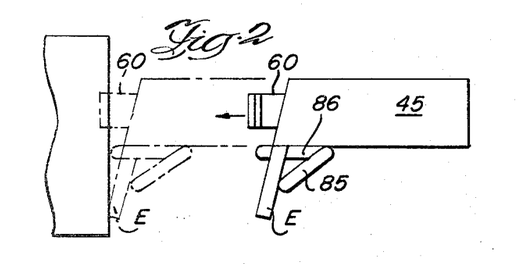
FIGURES 2 and 2A are diagrammatic top plan views illustrating the movement sequence of the applicator associated with a lower corner region of the bundle.
Figure 2A:
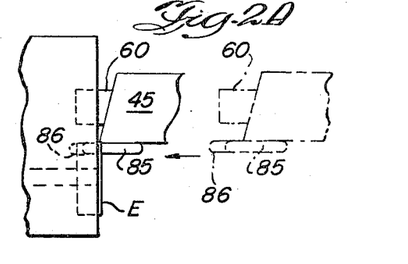

One of the features of this invention resides in the fact that each applicator functions in a fashion to permit the straight line travel of the applicator to effect accurate, snug seating of the edge protector E. This simplifies the entire mechanical arrangement and facilitates adapting a single installation to handling of different size bundles. The straight line motion of the applicator is depicted diagrammatically in FIGS. 2, 2A, 3 and 3A in the case of the lower corner applicator 45. In the top plan view of FIG. 2, the applicator as shown in full lines is in retracted position. When in this retracted position, the edge protector E is ejected and held by the applicator which is then advanced to the phantom line position of FIG. 2 to bring the edge protector into contact with the bundle. The applicator is then further advanced to the full line position illustrated in FIG. 2A to seat the edge protector E and hold it seated. Thereafter it moves toward its retracted position as illustrated in phantom lines in FIG. 2A and during this retraction movement the external arms 85 and 86 of the applicator lie alongside it as distinguished from being pivoted away. Thus, it is the action of ejecting a protector from the applicator which causes the arms 85 and 86 to fold out to assume positions wherein they aid in reorienting the protector as it approaches, contacts and seats on the bundle corner. The action of the arms in reorienting the protector E is more apparent in FIGS. 3 and 3A which are rear elevational views illustrating a similar sequence of movement of the applicator 45.

The orientation of the edge protector while held in the applicator during the approach of the applicator to the bundle is shown in FIG. 4 and the successive changes in position during contact and seating of the protector are shown in FIGS. 4A, 4B and 4C. It will be noted in FIG. 4A, that upon contact of the leading edge of the protector it undergoes rotation about its lengthwise axis, this being caused by continued movement of the applicator after contact of the protector and concurrent reaction of the arms 85 and 86 to such movement. FIG. 4B shows the position of the edge protector E shortly before final seating and it will be noted that the protector has swung laterally as it is finally guided by the arms 85 and 86. Finally, FIG. 4C shows the seated position of the edge protector.

With this general understanding of the function and action of the applicator 45, the specific construction details and their control in the positioning of the edge protector may now be described.

Figure 6:
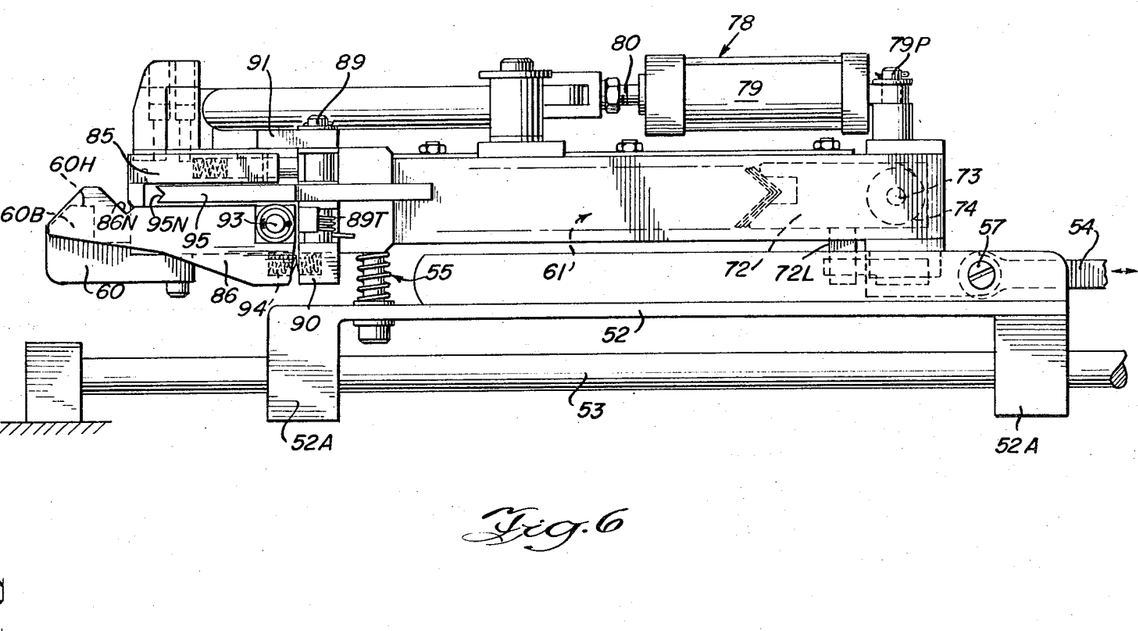
FIGURE 6 is a detailed side elevational view of the lower corner applicator shown in FIGURE 5.

As is shown in FIG. 6, the applicator 45 is carried on a support bracket 52 which is equipped with glide arms 52A that ride along a horizontal track 53 provided within the base structure 42 (FIG.1). A drive mechanism for effecting approach and retraction movement of the applicator 45 is represented only fragmentally as including a pneumatically or hydraulically operated drive shaft 54 shown connected to the bracket 52. The applicator 45 is mounted for limited vertical swivelling movement by means of a cushioned fastener 55 (FIG. 6) underlying the forward end of the applicator and connecting it to the bracket 52, and by means of a pair of swivel arms 56 (FIG.7) which pivot to a cross shaft 57 carried in a mounting sleeve 58 associated with the bracket and in turn receiving a rod eye end 54E provided on the drive shaft 54.

Figures 5, 9, 10:
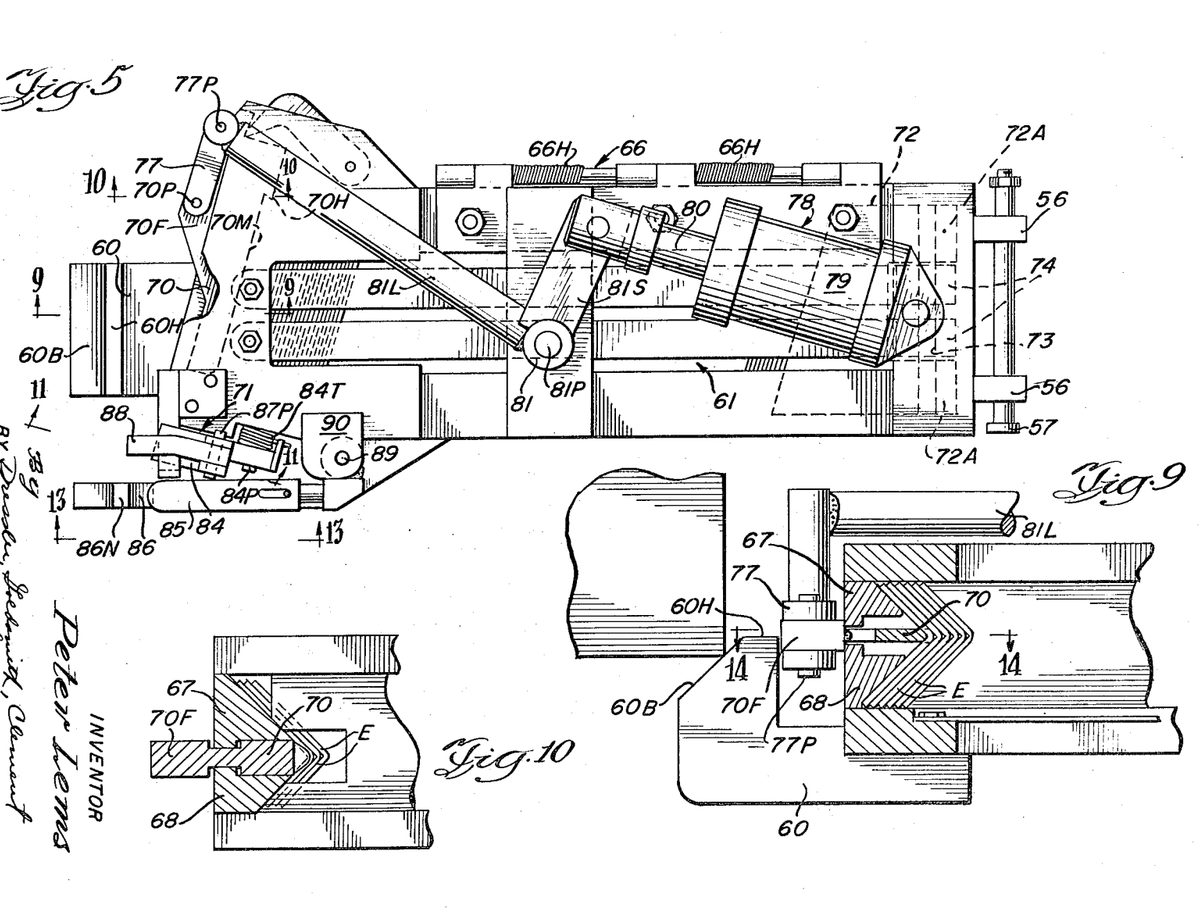
FIGURE 5 is a detail top plan view of the lower corner applicator.
FIGURE 9 is a fragmentary sectional view through the ejector element, being taken on the line 9—9 of FIGURE 5 and appearing on the same sheet.
FIGURE 10 is a fragmentary sectional view through the ejector element being taken on the line 10—10 of FIGURE 5 and appearing on the same sheet.

The cushioned fastener mechanism 55 enables a limited vertical pivoting movement of the applicator 45 about the axis of the cross shaft 57 sufficient to insure accurate final alignment of the edge protector with respect to the corner of the bundle. A bundle finder arm 60 is mounted in forwardly projecting relation from the under side of the feed end of the applicator 45 and as represented in FIG. 9 presents a beveled forward surface 60B for contact with the bundle edge during approach movement of the applicator. The finder arm 60 is deflected by contact with the corner region of the bundle to pivot the applicator downwardly until the horizontal contact surface 60H of the finder arm underlies and contacts the lower face of the bundle.

Figures 7, 7A, 8:
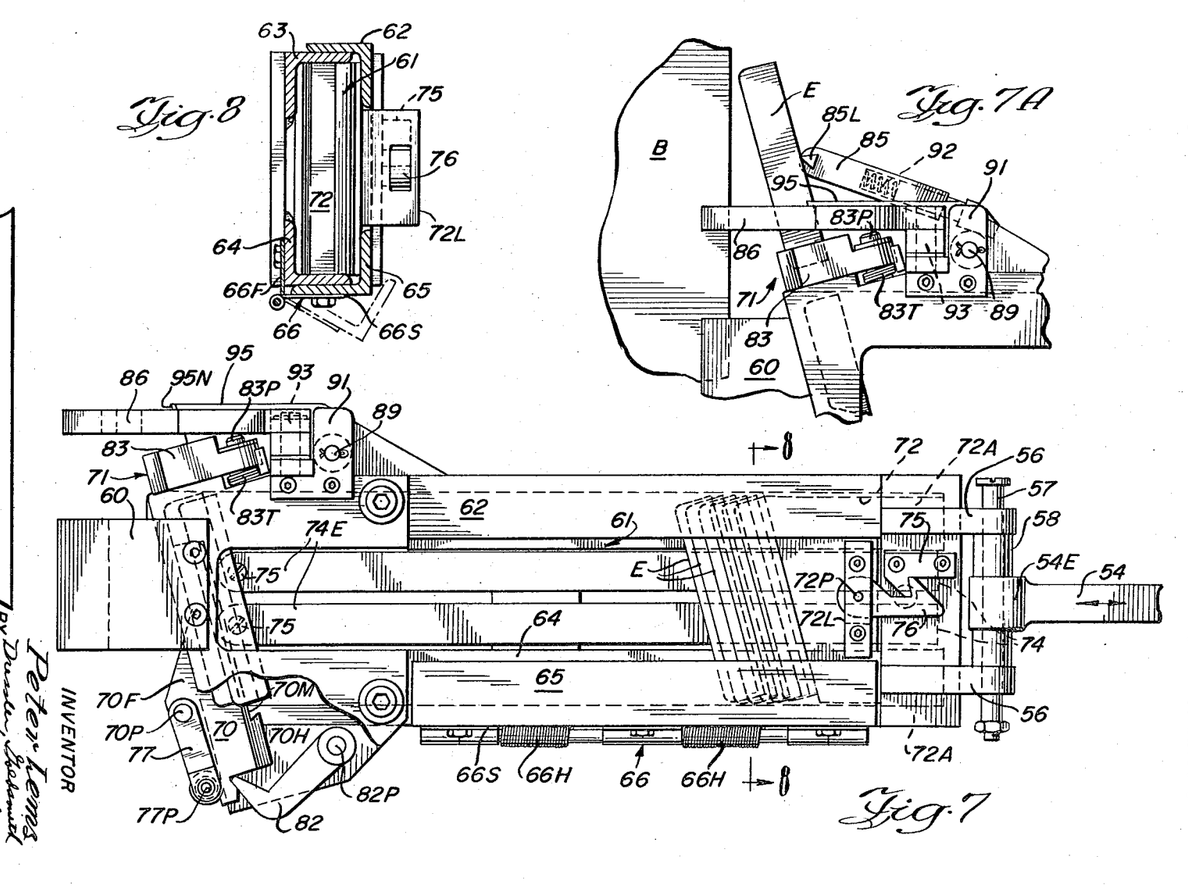
FIGURE 7 is a detailed bottom plan view of the same lower corner applicator.
FIGURE 7A is a fragmentary bottom view showing the fed end of the applicator of FIGURE 7 and representing an edge protector in ejected position and approaching contact with the bundle.
FIGURE 8 is a sectional and elevational view of the magazine portion of the applicator, being taken on the line 8—8 of FIGURE 7 and appearing on the same sheet.

The applicator 45 in the construction illustrated for purposes of disclosure includes an elongated hollow housing structure that constitutes a supply magazine 61 for holding a nested stack of edge protectors. As best seen in FIG. 8, the housing structure includes an assembly of elongated angles 62, 63, 64 and 65, one of which 65 is mounted by means of an elongated hinge mechanism 66 having a fixed leaf 66F bolted to the fixed angle 64 and having a swingable leaf 66S carrying the swingable angle. The hinge includes helical bias-springs 66H normally acting to hold the swingable angle 65 in a closed position but accommodating manual actuation of it to afford access to the supply magazine for facilitating initial loading of the edge protectors E, some of which are illustrated in the skewed position they assume within the magazine in FIG. 7.

Each edge protector E presents a pair of internal surfaces meeting at right angles to define a contact face which may be generally designated as concave. The nested stack of edge protectors is located in the magazine with each edge protector having its contact face foremost. A pair of side by side guide rails 67 and 68 are fixed within the feed end of the applicator housing structure cooperatively presenting angled seating surfaces 67S and 68S for the lead edge protector in the stack. The feed end of the applicator housing has the guide rails 67 and 68 arranged to extend at an angle oblique to the movement direction of the applicator 45 and the rails are spaced apart to define a central clearance slot which receives an ejector 70 that is reciprocably movable along the slot to effect one by one feeding of the edge protectors to a chute structure 71 (FIG. 11) which is carried outboard on the applicator housing at a position aligned with the oblique direction of travel of an edge protector as it exits from the side discharge opening.

While the supply of the nested stack of edge protectors to the ejector 70 can be accomplished by gravity where a vertically arranged applicator is used, the horizontally arranged applicators depicted in this disclosure are fed by spring action. For this purpose, a pressure pad 72 is slidably nested within the rear end of the supply magazine 61 and has spaced apart trailing arm portions 72A mounting a wind-up shaft 73 which is equipped with coiled band springs 74 having their outer ends 74E (FIG. 7) secured by fasteners 75 adjacent the fed end of the housing. The band springs 74 normally act to advance the pressure pad 72 towards the feed end of the housing to effect the desired feeding of the stack edge protectors.

To facilitate loading of edge protectors into the magazine 61 through the side wall opening afforded by the hinged angle 65, provision is made to retain the pressure pad 72 at its rearmost position against the biasing action of the band springs 74. The housing has a fixed catch 75 mounted outboard adjacent its rear end. The catch 75 is engageable with a latch 76 which is pivotally mounted from a pin 72P carried by an integral outboard lug portion 72L that is carried by the pressure pad and extends through a housing side wall opening defined by the spaced apart positioning of the angles 62 and 65 as shown in FIG. 8.

The catch 75 and pivotal latch 76 cooperate to retain the pressure pad 72 retracted during insertion of a stack of edge protectors. Thereafter, the pivotal latch 76 is swung about its mounting pin 72P by the operator to enable the spring 74 to load the pressure pad 72 against the stack of protectors.

The ejector 70 has a main body portion 70M shaped to serve as a carrier for supporting the edge protector at its corner region. Towards its rear end the ejector 70 has an upstanding horn 70H presenting a feed lip for endwise engagement with the single protector which is seated against the carrier 70M. Finally, the ejector includes a depending integral fin 70F projecting through the feed end of the housing structure and provided with a pivot pin 70P on which an external drive link 77 is connected.

Figures 13, 13A, 13B, 13C, 14, 15:
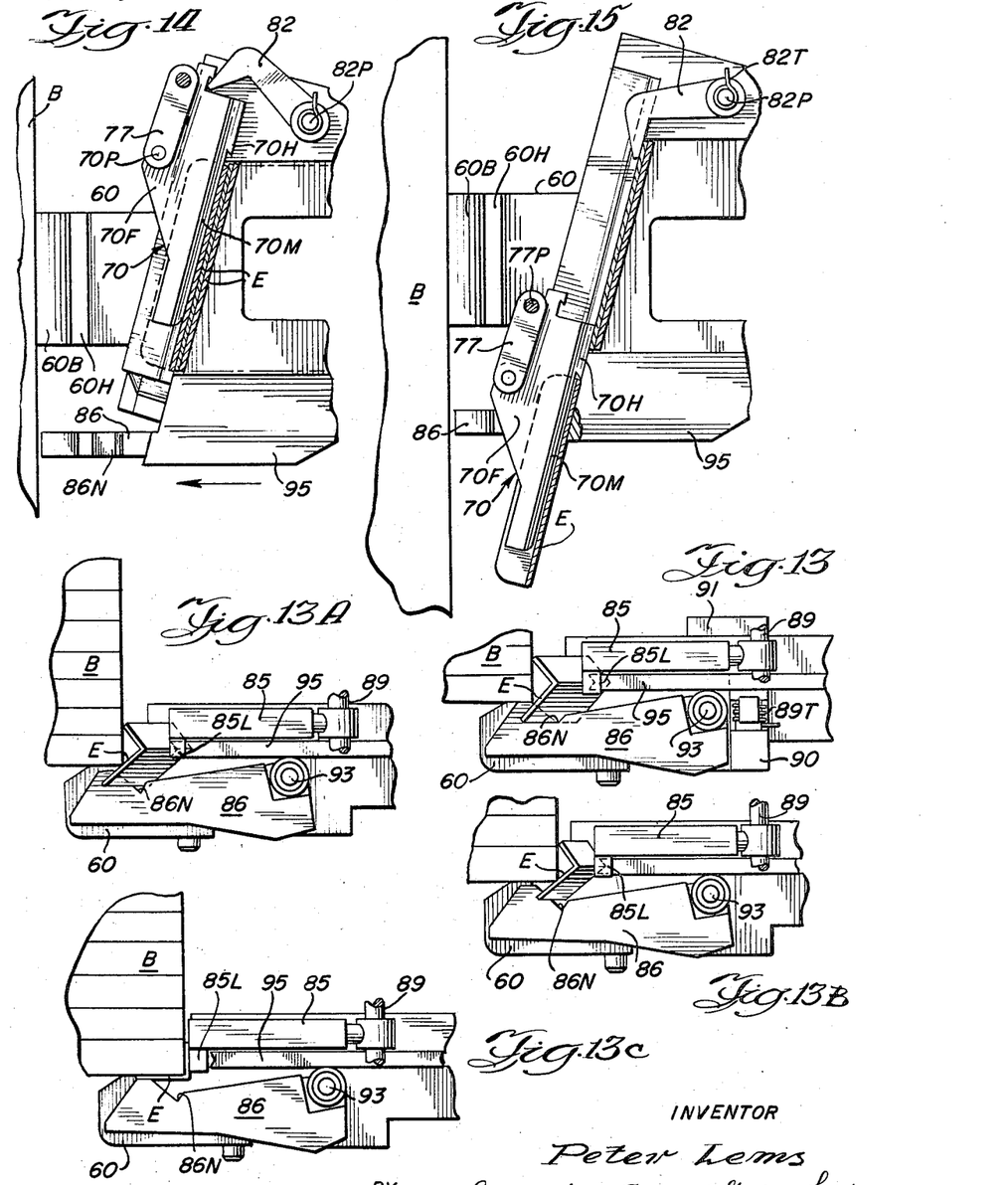
FIGURE 13 is a fragmentary side elevational view taken along the line 13—13 of FIGURE 5 and illustrating the levers associated with the chute for stripping an ejected edge protector.
FIGURES 13A, 13B and 13C are related side elevational views illustrating the lever movements during approach, contact and seating of an edge protector.
FIGURE 14 is a sectional and elevational view taken along the line 14—14 of FIGURE 9 showing the ejector held in retracted position.
FIGURE 15 is a view similar to FIGURE 14 and showing the ejector fully extended.

An actuating mechanism for the drive link 77 is designated generally at 78 in FIG. 5 and includes a pneumatic or hydraulic power cylinder 79 having one end pivoted externally to the housing structure on a fixed pin 79P and having a piston rod 80 extending from its opposite end and connected to the short arm 81S of a bell crank 81. The bell crank 81 is mounted externally on the housing structure to rotate about a fixed pin 81P and has its long arm 81L connected to the drive link 77 by a suitable pivot pin 77P. The actuating mechanism 78 is double acting and is operable upon extension of its piston rod 80 to drive the ejector 70 in a feed direction during which the first edge protector E is projected from the free end to be held in the external chute structure 71 upon retraction of the piston rod 80. The ejector travel action is best illustrated in FIGS. 14 and 15 and it will be noted that a follower 82 in the form of a hook is mounted to the applicator housing by means of a pivot shaft 82P which is equipped with a torsion spring 82T that biases the follower 82 in a counterclockwise direction as viewed in FIGS. 14 and 15. Thus, when the ejector 70 is retracted, the follower 82 presses against its rear face and as the ejector is advanced the follower 82 swings counterclockwise to hook beneath one end of the next edge protector and cooperate with the ejector horn 70H in retaining the stack during the actual ejection cycle. Upon subsequent retraction of the ejector, its rear end cams the follower to its inactive position of FIG. 14 and as the horn portion 70H of the ejector clears the aligned stack of protectors, the pressure pad 71 advances the stack to locate another protector in straddling relation on the ejector and in seating contact with the guide rails 67 and 68.

Figures 11, 11A, 12:
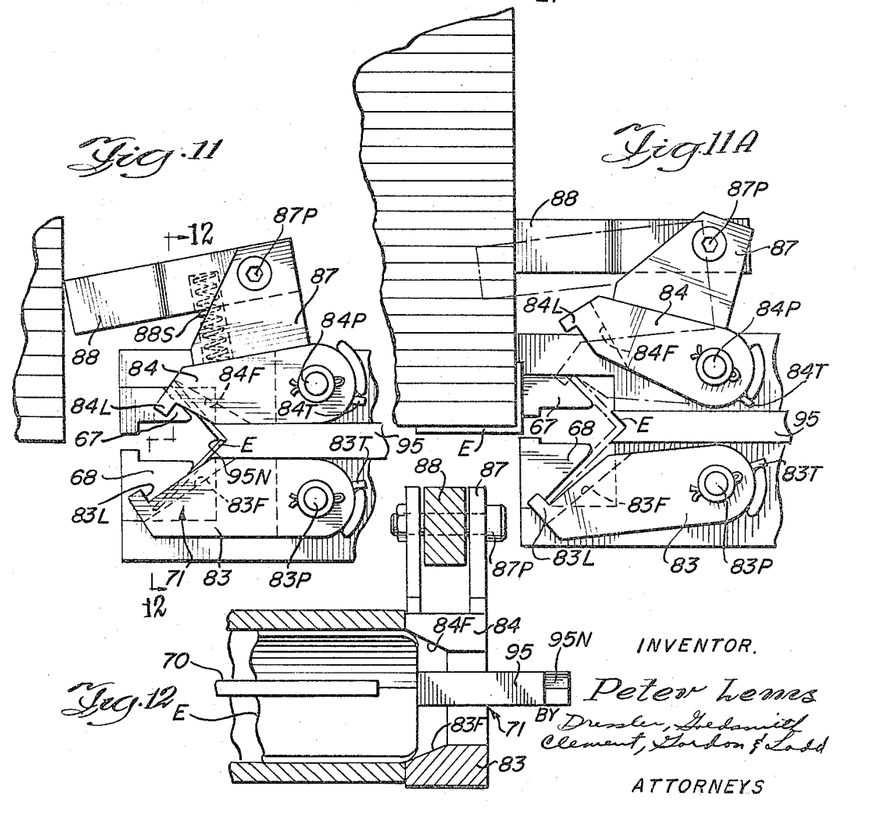
FIGURE 11 is a fragmentary sectional and elevational view of the exit chute relationships at the time of initial contact with the bundle, being taken on the line 11—11 of FIGURE 5 and appearing on the first drawing sheet with FIGURE 1.
FIGURE 11A is a view corresponding to FIGURE 11 and showing successive changed relationships at the chute during application of an edge protector to a lower corner region and also appears on the first drawing sheet with FIGURE 1.
FIGURE 12 is a sectional view taken along the line 12—12 of FIGURE 11 and appears on the first drawing sheet with FIGURE 1.

The chute 71 which holds an edge protector as it exits from the feed end of the applicator is constituted by a fixed plate 95 located to extend along an apex line defined by oppositely acting side by side located jaws 83 and 84 mounted externally to the housing on parallel pivot pins 83P and 84P as shown in side elevation in FIGS. 5 and 7 and as shown in sequential face views in FIGS. 11 and 11A. Each jaw pivot pin is equipped with a torsion spring 83T and 84T in an arrangement wherein the jaws are biased towards a closed position by these springs. Each of the jaws has an inclined cam face 83F and 84F which is flat and which is angled with respect to the delivery path of the edge protector so that the jaw cam faces are widest at the region which receives the exiting edge protector and are narrowest at the region most remote from the housing structure. Thus, the cam faces 83F and 84F present a guideway tapering from a maximum size at its inlet end to a minimum size at its remote end and as the ejector 70 advances each edge protector the jaws 83 and 84 swing open to establish a grip on the edge protector. Each jaw has a retention lip 83L and 84L engageable with the corresponding elongated edge of the protector to retain the same against accidental escape from the chute. In the preferred form illustrated herein, the jaws 83 and 84 are dimensioned to span only a fraction of the length of the edge protector and serve to hold the protector in an exposed outboard relationship to the housing with the lengthwise direction of the protector being oriented along a line which is oblique to the lengthwise direction of a bundle edge region.

Spring loaded levers 85 and 86 mounted externally on the housing present free ends intersecting the path of an edge protector as it moves into retained relationship in the chute structure 71. These levers 85 and 86 are arranged to engage the edge protector E externally to stabilize its position in the chute and to develop a force moment tending to strip the edge protector as the applicator 45 makes its final approach towards the bundle.

In addition, a bundle sensing actuator arrangement is provided for releasing the jaws 83 and 84 to free the edge protector as the applicator approaches the bundle. The actuator arrangement is associated with the jaw 84 which is positioned at the top in the views of FIGS. 11 and 11A. Thus the jaw 84 has a side arm extension 87 carrying a pivot pin 87P on which an actuator arm 88 is mounted. A compression spring 88S normally reacts between the jaw 84 and the actuator arm 88 to maintain the actuator arm in the slightly angled relationship in which it is pictured in FIG. 11. Upon final approach of the applicator 45 towards the bundle, the actuating arm 88 contacts the bundle and pivots appropriately until it establishes a broad faced contact therewith as illustrated in FIG. 11A. Thus, the actuating arm 88 acts to swing the jaw 84 to effect release of the protector from the chute at the time the protector approaches the bundle corner region.

The shorter of the positioning levers 85 is extensible and is pivotally mounted from a shaft 89 which as shown in FIG. 6 has opposite ends journaled in a stationary block 90 on the housing and in a pillow block 91 also on the housing (see FIG. 13), with a torsion spring 89T encircling the shaft 89 and biasing the same in a direction to maintain the lever 85 alongside the housing in the absence of an edge protector in the chute. The extensible lever 85 has relatively endwise slidable inner and outer sections normally maintained in extended relation by an internal compression spring 92 (FIGS. 6 and 7A) reacting therebetween. At its free end, the lever 85 has a lateral extension 85L provided with a knife edge socket that receives a midlength corner region of the edge protector E. As the edge protector enters and travels through the chute structure 71, its corner region picks up the lateral extension 85L and causes pivoting movement of the lever 85 about the shaft 89 towards the position illustrated in FIG. 7A wherein this lever resiliently exerts a force tending to urge the edge protector towards the bundle. The relationship is such that the lever arm 85 also aids in maintaining the positional stability of the edge protector E during its release from the chute and its seating upon the bundle corner region.

Figure 3:
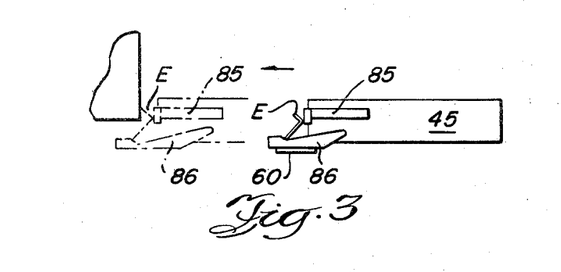
FIGURES 3 and 3A are diagrammatic rear elevational views also illustrating the movement sequence of the same lower corner applicator shown in FIGURE 2.
Figure 3A:
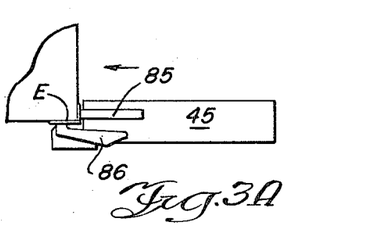

It may be noted that the edge protector undergoes a rotation about its lengthwise axis during actual seating, this being pictured in FIGS. 3 and 3A. The requisite rotational control is accomplished by the lever 86. The lever 86 is rotatable about a pivot shaft 93 carried by the housing and is normally biased in a clockwise direction as viewed in FIGS. 6 and 13 by means of a compression spring 94 reacting between the stationary block 90 and the lever 86.

The lever 86 is provided with an intermediate edge notch 86N which engages one lateral extremity of the edge protector E as it moves into the chute structure and causes limited rotation of the lever from its FIG. 6 position toward its FIG. 13 position. The lever 86 aids in guiding rotation of the edge protector E during final approach movement of the applicator 45 as represented in the sequence views 13, 13A, 13B and 13C.

The chute 71 includes a fixed plate 95 suitably notched as at 95N to define an apex that receives the lengthwise corner of the edge protector and stabilizes the same while it is gripped by the jaws 83 and 84.

Operation

The detailed operation of the external structure carried on the housing of the applicator for establishing and thereafter controlling the orientation of each ejected edge protector E may now be described. This structure is intended to operate under an environment where the applicator moves in a straight line having a predetermined relation to the exposed bundle corner region. This relationship is determined by the cam face 60B provided on the rigid finder arm 60 that extends forwardly of the applicator housing.

The edge protector E is held in its oblique orientation in the chute 71, a stable relationship existing by virtue of the cooperation between the plate 95 and the jaws 83 and 84. The principal function of the chute 71 is to hold the edge protector until it comes adjacent to and contacts the corresponding bundle corner region. The upper jaw 84 has its extension 87 equipped with an actuator arm 88 for engagement with the bundle to release the upper jaw and facilitate stripping of the edge protector from the chute 71.

The act of ejecting the edge protector from the applicator housing into the chute cocks the spring loaded levers 85 and 86 so that the lever 85 acts to move the edge protector forwardly from the chute and so that the lever 86 tends to rotate the edge protector about its lengthwise corner line.

Therefore, as the travel of the applicator housing brings it up to the bundle, the finder arm 60 accurately orients the ejected edge protector in the desired initial relationship to the bundle corner region. The actuating arm 88 opens the jaw 84 to facilitate stripping of the edge protector from the chute 71. The pivotally mounted lever 85 is also resiliently extensible and it applies a force medially to the edge protector tending to advance it against the bundle. This force in conjunction with a force developed between the free end of the edge protector and the bundle corner region which it contacts, constitutes a force couple tending to swivel the edge protector from its initial oblique or skewed relationship to a parallel relationship with respect to the corner region of the bundle. Concurrently, the lever 86 tends to rotate the edge protector about its lengthwise corner line to bring the concave face of the edge protector into flush full surface overlying contact with the bundle corner region.

In summary, the detailed relationships and action of the chute structure 71 is best shown in FIGS. 11, 11A and 12. The detailed action of the extensible and pivotal lever arm 85 is best shown in FIGS. 7 and 7A. The detailed actuation of the lever arm 86 is best shown in FIGS. 13A, 13B and 13C and the diagrammatic illustrations of the composite action of all of the structure in controlling the position of an edge protector E is illustrated in the sequence views of each of FIGS. 2, 3 and 4.

Thus, while preferred constructional features of the invention are embodied in the structure illustrated herein, it is to be understood that changes and variations may be made by those skilled in the art without departing from the spirit and scope of the appended claims.

What is claimed is:

1. In a strapping system that includes a strapping station having a support for locating a bundle at such station with at least one corner region of the bundle exposed, strapping means at said station for encircling the bundle with a strap loop arranged to intersect the exposed bundle corner regions and for thereafter tightening and sealing the strap loop about the bundle and means at said station operable in timed relation with said strapping means for applying an edge protector of a type having a concave contact face to the exposed corner region to be intersected by the strap loop prior to tightening and sealing of the strap loop such that the loop engages the edge protector when the loop is tightened, said last named means including an applicator having housing structure constituting a supply magazine holding a nested stack of edge protectors biased to move contact face foremost toward a feed end of the housing structure that is provided with a side discharge opening, a chute outboard on said housing and aligned with the discharge opening to receive an edge protector as it exists from the magazine, said chute being constituted by spring loaded side by side jaws mounted to the housing to flank the discharge opening and engage and hold an edge protector at opposite lateral extremities, an ejector movably carried by said housing at said feed end of the magazine and aligned with said chute, said ejector having means endwise engageable with the lead edge protector of said stack during movement of said ejector, means on said housing for reciprocably moving said ejector along said chute when said applicator is remote from the exposed corner region, spring loaded levers pivoted outboard on said housing and intersecting the path of an edge protector being moved into said chute by said ejector to undergo swinging movement along such path and stabilize in final contact against the exposed face of the edge protector, and means for moving the applicator between a retracted position remote from the bundle corner region and a feed position adjacent such region in a fashion to advance the resiliently held ejected edge protector towards the corner region, with the edge protector having its free end foremost and extending along a line oblique to the line of the exposed corner region to engage such free end against the corner region during approach and cause said levers to reorient and strip the edge protector from the chute as actual feed position is reached.

2. In a strapping system for bundles of generally rectangular sectional outline, said system including a strapping station having a support for locating the bundle at such station to present a pair of exposed lower bundle corner regions at a lower level determined by the support and a pair of exposed upper bundle corner regions at an upper level determined by the size of the bundle on the support, a vertically shiftable compression member engageable against the top of the bundle, strapping means at said station carried on said compression member and operable for encircling the bundle with a strap loop arranged to intersect the exposed bundle corner regions and thereafter operable for tightening and sealing the strap loop about the bundle; edge protector mounting apparatus comprising horizontal lower track means aligned substantially with each bundle corner region at the lower level, horizontal upper track means incorporated in said compression member to be substantially aligned with each bundle corner region at the upper level when the compression member engages the top of the bundle, a separate applicator corresponding to each exposed bundle corner region and mounted on the corresponding track means for movement between a retracted position remote from such corner region and a feed position adjacent such corner region, and motion producing means at said station connected for advancing the applicators concurrently for applying an edge protector to each exposed corner region to be intersected by the strap loop prior to tightening and sealing of the strap loop such that the strap loop engages the edge protectors when the loop is tightened.

3. Apparatus for feeding an edge protector into protective overlying relation upon an exposed corner region of a bundle and comprising an applicator device and means for moving the applicator device between a retracted position remote from such corner region and a feed position adjacent such corner region, said applicator device including housing structure constituting a supply magazine that is provided with a side discharge opening, a chute outboard on said housing and aligned with the discharge opening to receive an edge protector exiting from the magazine, said chute being constituted by a fixed plate located on said housing to extend along an apex line defined by spring loaded jaws mounted to the housing to flank the discharge opening to engage and hold an edge protector at opposite extremities, an ejector at said end of the magazine and movably aligned with said chute, means on said housing for reciprocably moving said ejector along said chute when said applicator device is remote from the exposed corner region, spring loaded levers pivoted outboard on said housing and intersecting the path of an edge protector being moved along said chute by said ejector each to undergo swinging movement relative to the path of the edge protector and stabilize in position orienting contact against the edge protector, one of said levers being resiliently extensible and having a pivot axis normal to the lengthwise direction of the edge protector and being engageable along an apex region of the edge protector, the other of said levers having a pivot axis generally parallel to the line of the exposed corner region and being engageable along a lateral extremity of the edge protector, and means for moving the applicator device between a retracted position remote from the bundle corner region and a feed position adjacent such region in a fashion to advance the resiliently held ejected edge protector oriented in coplanar relation to the corner region and extending free end foremost along a line oblique to the line of the exposed corner region to engage such edge protector free end against the corner region during approach and cause said levers to orient and strip the edge protector from the chute as actual feed position is reached.

4. Apparatus for feeding an edge protector into protective overlying relation upon an exposed corner region of a bundle and comprising an applicator device and means for moving the applicator device between a retracted position remote from such corner region and a feed position adjacent such corner region, said applicator device including housing structure constituting a supply magazine that is provided with a side discharge opening, a chute outboard on said housing and aligned with the discharge opening to receive an edge protector exiting from the magazine, said chute being constituted by a fixed plate located on said housing to extend along an apex line defined by spring loaded pivotal jaws mounted to the housing to flank the discharge opening to engage and hold an edge protector at opposite extremities, one of said jaws having an extension providing a forwardly extending actuator arm engageable with the bundle of swing the said one jaw open, an ejector at said end of the magazine and movably aligned with said chute, means on said housing for reciprocably moving said ejector along said chute when said applicator device is remote from the exposed corner region, spring loaded levers pivoted outboard on said housing and intersecting the path of an edge protector being moved along said chute by said ejector each to undergo swinging movement relative to the path of the edge protector and stabilize in position orienting contact against the edge protector, one of said levers being resiliently extensible and having a pivot axis normal to the lengthwise direction of the edge protector and being engageable along an apex region of the edge protector, the other of said lever having a pivot axis generally parallel to the line of the exposed corner region and being engageable along a lateral extremity of the edge protector, and means for moving the applicator device between a retracted position remote from the bundle corner region and a feed position adjacent such region in a fashion to advance the resiliently held ejected edge protector oriented in coplanar relation to the corner region and extending free end foremost along a line oblique to the line of the exposed corner region to engage such edge protector free end against the corner region during approach and cause said levers to orient and strip the edge protector from the chute as actual feed position is reached.

5. Apparatus for feeding an edge protector into protective overlying relation upon an exposed corner region of a bundle and comprising an applicator device and means for moving the applicator device between a retracted position remote from such corner region and a feed position adjacent such corner region, said applicator device including housing structure constituting a supply magazine that is provided with a side discharge opening, a chute outboard on said housing and aligned with the discharge opening to receive an edge protector exiting from the magazine, said chute being constituted by a fixed plate located on said housing to extend along an apex line defined by spring loaded jaws mounted to the housing to flank the discharge opening to engage and hold an edge protector at opposite extremities, an ejector at said end of the mafiazine and movably alinged with said chute, means on said housing for reciprocably moving said ejector along said chute when said applicator device is remote from the exposed corner region, spring loaded levers pivoted outboard on said housing and intersecting the path of an edge protector being moved along said chute by said ejector each to undergo swinging movement relative to the path of the edge protector and stabilize in position orienting contact against the edge protector, one of said levers being resiliently extensible and having a pivot axis normal to the lengthwise direction of the edge protector and being engageable along an apex region of the edge protector, the other of said levers having a pivot axis generally parallel to the line of the exposed corner region and being engageable along a lateral extremity of the edge protector, and means for moving the applicator device between a retracted position remote from the bundle corner region and a feed position adjacent such region in a fashion to advance the resiliently held ejected edge protector oriented in coplanar relation to the corner region and extending free end foremost along a line oblique to the line of the exposed corner region to engage such edge protector free end against the corner region during approach and cause said levers to orient and strip the edge protector from the chute as actual feed position is reached, said last named means including swivel mounting structure for the applicator housing and a rigid front extension on the housing presenting a cam face to the bundle to effect swivelling of the housing to the desired relationship with the bundle corner region.

6. Apparatus for feeding an edge protector into protective overlying relation upon an exposed corner region of a bundle and comprising an applicator device and means for moving the applicator device between a retracted position remote from such corner region and a feed position adjacent such corner region, said applicator device including housing structure constituting a supply magazine holding a stack of nested concave edge protectors biased to move contact face foremost toward an end of the housing structure that is provided with a side discharge opening, a chute outboard on said housing and aligned with the discharge opening to receive an edge protector exiting from the magazine, said chute being constituted by a fixed plate located on said housing to extend along an apex line defined by spring loaded pivotal jaws mounted to the housing to flank the discharge opening and present contoured resiliently separable lips to engage and hold an edge protector at opposite extremities, one of said jaws having an extension providing a forwardly extending actuator arm engageable with the bundle to swing the said one jaw open, an ejector at said end of the magazine and movably aligned with said chute, said ejector having means endwise engageable with the lead edge protector of said stack and having stop means operable to block said stack during movement of said ejector, means on said housing for reciprocably moving said ejector along said chute when said applicator device is remote from the exposed corner region, spring loaded levers pivoted outboard on said housing and intersecting the path of an edge protector being moved along said chute by said ejector each to undergo swinging movement relative to the path of the edge protector and stabilize in position orienting contact against the edge protector, one of said levers being resiliently extensible and having a pivot axis normal to the lengthwise direction of the edge protector and being engageable along an apex region of the edge protector, the other of said levers having a pivot axis generally parallel to the line of the exposed corner region and being engageable along a lateral extremity of the edge protector, and means for moving the applicator device between a retracted position remote from the bundle corner region and a feed position adjacent such region in a fashion to advance the resiliently held ejected edge protector oriented in coplanar relation to the corner region and extending free end foremost along a line oblique to the line of the exposed corner region to engage such edge protector free end against the corner region during approach and cause said levers to orient and strip the edge protector from the chute as actual feed position is reached, said last named means including swivel mounting structure for the applicator housing and a rigid front extension on the housing presenting a cam face to the bundle to effect swivelling of the housing to the desired relationship with the bundle corner region.

7. In a strapping system that includes a strapping station having a support for locating a bundle at such station with at least one corner region of the bundle exposed, strapping means at said station for encircling the bundle with a strap loop arranged to intersect the exposed bundle corner region and for thereafter tightening and sealing the strap loop about the bundle and means at said station operable in timed relation with said strapping means for applying an edge protector to the exposed corner region to be intersected by the strap loop prior to tightening and sealing of the strap loop such that the loop engages the edge protector when the loop is tightened, said last named means including an applicator having external releasable holding means at its forward end and carrying an edge protector facing in seatable relation towards the exposed corner region, said holding means including an outboard chute constituted by a fixed plate located to extend along an apex line defined by spring loaded jaws to engage and hold an edge protector and spring loaded levers intersecting the path of an edge protector entering said chute to undergo swinging movement relative to such path and stabilize in position orienting contact against the edge protector, and substantially straight line movement means mounting said applicator at said station for approach movement of its forward end toward the corner region to effect stripping of the edge protector from said holding means by contact of the edge protector with such corner region during final approach movement of the applicator.

8. In a strapping system that includes a strapping station having a support for locating a bundle at such station with at least one corner region of the bundle exposed, strapping means at said station for encircling the bundle with a strap loop arranged to intersect the exposed bundle corner region and for thereafter tightening and sealing the strap loop about the bundle and means at said station operable in timed relation with said strapping means for applying an edge protector to the exposed corner region to be intersected by the strap loop prior to tightening and sealing of the strap loop such that the loop engages the edge protector when the loop is tightened, said last named means including an applicator having external releasable holding means at its forward end and carrying an edge protector facing in seatable relation towards the exposed corner region, said holding means including an outboard chute constituted by a fixed plate located to extend along an apex line defined by spring loaded jaws to engage and hold an edge protector and spring loaded levers intersecting the path of an edge protector entering said chute to undergo swinging movement relative to such path and stabilize in position orienting contact against the edge protector, one of said levers being resiliently extensible and having a pivot axis normal to the lengthwise direction of the edge protector and being engageable along an apex region of the edge protector, the other of said levers having a pivot axis generally parallel to the line of the exposed corner region and being engageable along a lateral extremity of the edge protector, and substantially straight line movement means mounting said applicator at said station for approach movement of its forward end toward the corner region to effect stripping of the edge protector from said holding means by contact of the edge protector with such corner region during final approach movement of the applicator.

9. In a strapping system for bundles of generally rectangular sectional outline, said system including a starpping station having a support for locating the bundle at such station to prevent a pair of exposed lower bundle corner regions at a lower level determined by the support and a pair of exposed upper bundle corner regions at an upper level determined by the size of the bundle on the support, a vertically shiftable compression member engageable against the top of the bundle, strapping means at said station carried on said compression member and operable for encircling the bundle with a strap loop arranged to intersect the exposed bundle corner regions and thereafter operable for tightening and sealing the strap loop about the bundle; edge protector mounting apparatus comprising horizontal lower track means aligned substantially with each bundle corner region at the lower level, horizontal upper track means incorporated in said compression member to be substantially aligned with each bundle corner region at the upper level when the compression member engages the top of the bundle, a separate applicator corresponding to each exposed bundle corner region and mounted on the corresponding track means for movement between a retracted position remote from such corner region and a feed position adjacent such corner region, each said applicator including housing structure constituting a supply magazine that is provided with a side discharge opening, a chute outboard on said housing and aligned with the discharge opening to receive an edge protector existing from the magazine, said chute being constituted by a fixed plate located on said housing to extend along an apex line defined by spring loaded jaws mounted to the housing to flank the discharge opening to engage and hold an edge protector at opposite extremities, an ejector at said end of the magazine and movably aligned with said chute, means on said housing for reciprocably moving said ejector along said chute when said applicator device is remote from the exposed corner region, spring loaded levers pivoted outboard on said housing and intersecting the path of an edge protector being moved along said chute by said ejector each to undergo swinging movement relative to the path of the edge protector and stabilize in position orienting contact against the edge protector, one of said levers being resiliently extensible and having a pivot axis normal to the lengthwise direction of the edge protector and being engageable along an apex region of the edge protector, the other of said levers having a pivot axis generally parallel to the line of the exposed corner region and being engageable along a lateral extremity of the edge protector, and means for moving the applicator device between a retracted position remote from the bundle corner region and a feed position adjacent such region in a fashion to advance the resiliently held ejected edge protector oriented in coplanar relation to the corner region and extending free end foremost along a line oblique to the line of the exposed corner region to engage such edge protector free end against the corner region during approach and cause said levers to orient and strip the edge protector from the chute as actual feed position is reached.

10. In a strapping system for bundles of generally rectangular sectional outline, said system including a strapping station having a support for locating the bundle at such station to present a pair of exposed lower bundle corner regions at a lower level determined by the support and a pair of exposed upper bundle corner regions at an upper level determined by the size of the bundle on the support, a vertically shiftable compression member engageable against the top of the bundle, strapping means at said station carried on said compression member and operable for encircling the bundle with a strap loop arranged to intersect the exposed bundle corner regions and thereafter operable for tightening and sealing the strap loop about the bundle; edge protector mounting apparatus comprising horizontal lower track means aligned substantially with each bundle corner region at the lower level, horizontal upper track means incorporated in said compression member to be substantially aligned with each bundle corner region at the upper level when the compression member engages the top of the bundle, a separate applicator corresponding to each exposed bundle corner region and mounted on the corresponding track means for movement between a retracted position remote from such corner region and a feed position adjacent such corner region, each said applicator including housing structure constituting a supply magazine that is provided with a side discharge opening, a chute outboard on said housing and aligned with the discharge opening to receive an edge protector existing from the magazine, said chute being constituted by a fixed plate located on said housing to extend along an apex line defined by spring loaded jaws mounted to the housing to flank the discharge opening to engage and hold an edge protector at opposite extremities, one of said jaws having an extension providing a forwardly extending actuator arm engageable with the bundle to swing the arm open, an ejector at said end of the magazine and movably aligned with said chute, means on said housing for reciprocably moving said ejector along said chute when said applicator device is remote from the exposed corner region, spring loaded levers pivoted outboard on said housing and intersecting the path of an edge protector being moved along said chute by said ejector each to undergo swinging movement relative to the path of the edge protector and stabilize in position orienting contact against the edge protector, one of said levers being resiliently extensible and having a pivot axis normal to the lengthwise direction of the edge protector and being engageable along an apex region of the edge protector, the other of said levers having a pivot axis generally parallel to the line of the exposed corner region and being engageable along a lateral extremity of the edge protector, and means for moving the applicator device between a retracted position remote from the bundle corner region and a feed position adjacent such region in a fashion to advance the resiliently held ejected edge protector oriented in coplanar relation to the corner region and extending free end foremost along a line oblique to the line of the exposed corner region to engage such edge protector from the chute as actual feed position is approach and cause said levers to orient and strip the edge protector from the chute as actual feed position is reached.

11. In a strapping system for bundles of generally rectangular sectional outline, said system including a strapping station having a support for locating the bundle at such station to present a pair of exposed lower bundle corner regions at a lower level determined by the support and a pair of exposed upper bundle corner regions at an upper level determined by the size of the bundle on the support, a vertically shiftable compression member engageable against the top of the bundle, strapping means at said station carried on said compression member and operable for encircling the bundle with a strap loop arranged to intersect the exposed bundle corner regions and thereafter operable for tightening and sealing the strap loop about the bundle; edge protector mounting apparatus comprising horizontal lower track means aligned substantially with each bundle corner region at the lower level, horizontal upper track means incorporated in said compression member to be substantially aligned with each bundle corner region at the upper level when the compression member engages the top of the bundle, a separate applicator corresponding to each exposed bundle corner region and mounted on the corresponding track means for movement between a retracted position remote from such corner region and a feed position adjacent such corner region, each said applicator including housing structure constituting a supply magazine holding a stack of nested concave edge protectors biased to move contact face foremost toward an end of the housing structure that is provided with a side discharge opening, a chute outboard on said housing and aligned with the discharge opening to receive an edge protector exiting from the magazine, said chute being constituted by a fixed plate located on said housing to extend along an apex line defined by spring loaded jaws mounted to the housing to flank the discharge opening and present contoured resiliently separable lips to engage and hold an edge protector at opposite extremities, one of said jaws having an extension providing a forwardly extending actuator arm engageable with the bundle to swing the arm open, an ejector at said end of the magazine and movably aligned with said chute, said ejector having means endwise engageable with the lead edge protector of said stack and having stop means operable to block said stack during movement of said ejector, means on said housing for reciprocably moving said ejector along said chute when said applicator device is remote from the exposed corner region, spring loaded levers pivoted outboard on said housing and intersecting the path of an edge protector being moved along said chute by said ejector each to undergo swinging movement relative to the path of the edge protector and stabilize in position orienting contact against the edge protector, one of said levers being resiliently extensible and having a pivot axis normal to the lengthwise direction of the edge protector and being engageable along an apex region of the edge protector, the other of said levers having a pivot axis generally parallel to the line of the exposed corner region and being engageable along a lateral extremity of the edge protector, and means for moving the applicator device between a retracted position remote from the bundle corner region and a feed position adjacent such region in a fashion to advance the resiliently held ejected edge protector oriented in coplanar relation to the corner region and extending free end foremost along a line oblique to the line of the exposed corner region to engage such edge protector free end against the corner region during approach and cause said levers to orient and strip the edge protector from the chute as actual feed position is reached, said last named means including swivel mounting structure for the applicator housing and a rigid front extension on the housing presenting a cam face to the bundle to effect swivelling of the housing to the desired relationship with the bundle corner region.

12. In a strapping system that includes a strapping station having a support for locating a bundle at such station with at least one corner region of the bundle exposed, strapping means at said station for encircling the bundle with a strap loop arranged to intersect the exposed bundle corner region and for thereafter tightening and sealing the strap loop about the bundle and means at said station operable in timed relation with said strapping means for applying an edge protector to the exposed corner region to be intersected by the strap loop prior to tightening and sealing of the strap loop such that the loop engages the edge protector when the loop is tightened, said last named means including a track extending substantially perpendicular to the bundle adjacent said corner region, an applicator mounted on said track and having housing structure constituting an elongated supply magazine directed toward a bundle surface immediately adjacent the bundle corner region and having a feed end provided with a side discharge opening, said magazine containing a nested stack of angled-leg type edge protectors biased to move concave face foremost successively to register each edge protector endwise with said opening, means to eject the lead edge protector endwise through said opening, external gripper means mounted on said housing structure to define a chute adjacent said opening for releasably holding an ejected edge protector in an inclined oblique orientation wherein the edge protector has its free end forward of its gripped end and presents a free end leg corner aligned for contact with said bundle surface, and means for moving said applicator along said track to advance the same feed end foremost along a path oriented generally normal to said bundle surface to bring said free end leg corner of the edge protector into initial contact with said bundle surface to effect stripping of the edge protector from said gripper means during final approach movement of the applicator.

13. In a strapping system that includes a strapping station having a support for locating a bundle at such station with at least one corner region of the bundle exposed, strapping means at said station for encircling the bundle with a strap loop arranged to intersect the exposed bundle corner region and for thereafter tightening and sealing the strap loop about the bundle and means at said station operable in timed relation with said strapping means for applying an edge protector to the exposed corner region to be intersected by the strap loop prior to tightening and sealing of the strap loop such that the loop engages the edge protector when the loop is tightened, said last named means including an applicator having housing structure constituting an elongated supply magazine directed toward a bundle surface immediately adjacent the bundle corner region and having a feed end provided with a side discharge opening, said magazine containing a nested stack of angled-leg type edge protectors biased to move concave face foremost successively to register each edge protector endwise with said opening, means to eject the lead edge protector endwise through said opening, external gripper means mounted on said housing structure to define a chute adjacent said opening for releasably holding an ejected edge protector in an inclined oblique orientation wherein the edge protector has its free end forward of its gripped end and presents a free end leg corner aligned for contact with said bundle surface, and straight line movement means mounting said applicator at said station to advance the same feed end foremost along a path oriented generally normal to said bundle surface to bring said free end leg corner of the edge protector into initial contact with said bundle surface to effect stripping of the edge protector from said gripper means during final approach movement of the applicator.

14. In a strapping system in acordance with claim 13 and wherein said magazine stores said nested stack of edge protectors in an inclined orientation corresponding to the orientation of an ejected edge protector in said chute and wherein said means to eject advances the lead edge protector in stack in a straight line endwise travel through said opening into said chute.

15. In a strapping system in accordance with claim 13 and wherein said external gripper means includes a cooperating spring-loaded pair of side by side jaws (83, 84) swingably mounted to flank the discharge opening and engage and hold an ejected edge protector at opposite lateral leg extremities, said gripper means having back up means along an apex line defined by said jaws and engageable with the ejected edge protector to serve as a fulcrum for effecting stripping of the ejected edge protector from said jaws by bundle contact of said leg end corner during final straight line approach movement of said applicator towards the bundle.

16. In a strapping system in accordance with claim 15 and wherein said external gripper means includes means engageable with said bundle during final approach movement of said applicator for effecting release of the jaw associated with the initial bundle contact leg of the edge protector before the other jaw whereby said other jaw imparts a lateral thrust on the other leg of the edge protector during seating thereof.

17. In a strapping system in accordance with claim 16 and wherein said external gripper means includes a shiftably mounted lever (86) engageable with the other leg of the ejected edge protector to impart a final rotary twist for seating the protector flush against the bundle corner region.

18. In a strapping system in accordance with claim 17 wherein said external gripper means includes a lever (85) mounted to pivot about an axis transverse of the length of the ejected edge protector in said chute and engageable along an intermediate apex region thereof to exert a force tending to seat the edge protector.

References Cited

UNITED STATES PATENTS

| | | | |
|---|---|---|---|
| 3,003,296 | 10/1961 | Feldkump et al. | 53—198 |
| 3,019,577 | 2/1962 | Slamar et al. | 53—74 |
| 3,241,287 | 3/1966 | Chundelak | 53—128 |

WILLIAM W. DYER, JR., *Primary Examiner.*

N. ABRAMS, *Assistant Examiner.*

UNITED STATES PATENT OFFICE
CERTIFICATE OF CORRECTION

Patent No. 3,378,987  April 23, 1968

Peter Lems

It is certified that error appears in the above identified patent and that said Letters Patent are hereby corrected as shown below:

Column 3, line 34, "fed" should read -- feed --. Column 4, line 29, "farme" should read -- frame --. Column 7, line 31, "fed" should read -- feed --. Column 12, line 14, "of" should read -- to --; line 35, "cornor" should read -- corner --. Column 14, line 56, "prevents" should read -- presents --. Column 16, line 20, cancel "from the chute as actual feed position is" and insert -- free end against the corner region during --.

Signed and sealed this 16th day of September 1969.

(SEAL)
Attest:

Edward M. Fletcher, Jr.  WILLIAM E. SCHUYLER, JR.
Attesting Officer  Commissioner of Patents